March 20, 1962  W. G. ROWELL  3,026,004
SAFETY SWITCH METHOD AND MECHANISM FOR TANK TRUCK VEHICLES
Filed May 22, 1958  2 Sheets-Sheet 1

Inventor:
William G. Rowell,
By Porter, Chittick & Russell
Attorneys

March 20, 1962 W. G. ROWELL 3,026,004
SAFETY SWITCH METHOD AND MECHANISM FOR TANK TRUCK VEHICLES
Filed May 22, 1958 2 Sheets-Sheet 2
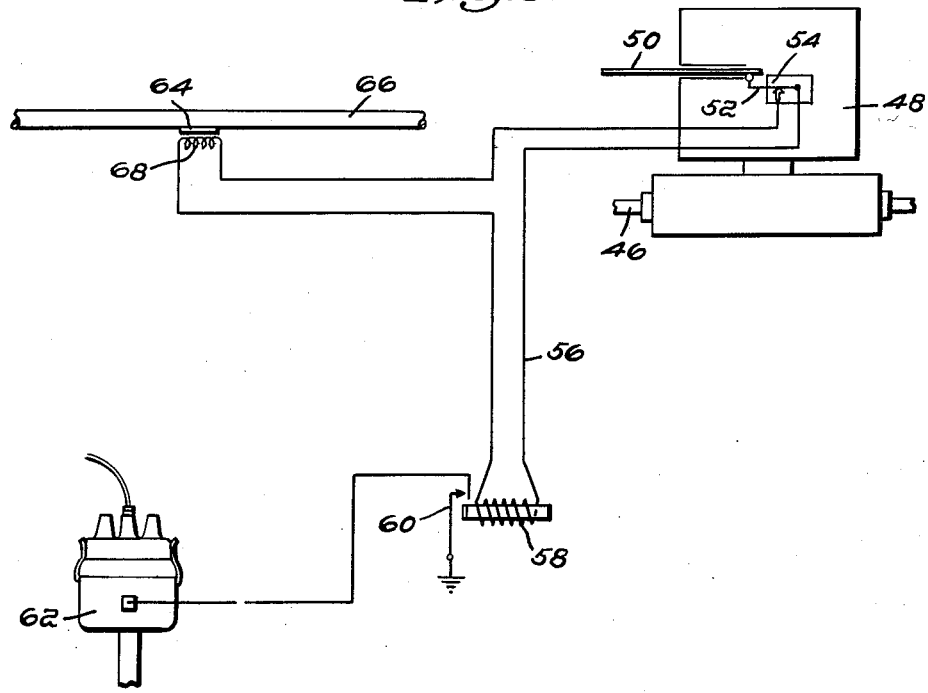
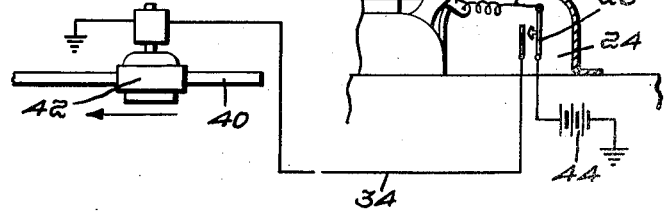

United States Patent Office 3,026,004
Patented Mar. 20, 1962

3,026,004
SAFETY SWITCH METHOD AND MECHANISM
FOR TANK TRUCK VEHICLES
William G. Rowell, Quincy, Mass., assignor to Scully
Signal Company, Melrose, Mass., a corporation of Massachusetts
Filed May 22, 1958, Ser. No. 737,112
3 Claims. (Cl. 222—30)

This invention relates to tank truck vehicles primarily used to transport products (ordinarily liquids) from one point to another. Such vehicles are characterized by a tank which may have one or more covered top openings and may be divided into one or more compartments. This invention is particularly concerned with the provision of means cooperating with the covered openings and the vehicle engine whereby the engine is automatically rendered inoperative whenever one or more of the openings are uncovered. A method and means for recording the number of times the cover is opened is also included herein as part of the present invention.

In the use of tank truck vehicles, two serious problems are encountered. The first problem is concerned with the possible catastrophic disaster that could occur if the cover of the tank should inadvertently be left open when the vehicle is transporting the product which may be, and often is, a highly flammable or possibly explosive liquid, such as gasoline, for example. It requires little imagination to understand how the truck electrical system, friction sparks, a hot exhaust pipe, etc. could readily ignite combustible vapors escaping from an open tank cover even if the product were not flammable or explosive, there could be a considerable economic loss caused by the product sloshing out through the open cover. Also, tank vehicles carrying acids or similar products under the conditions of an open cover could merely through spillage be hazardous to life and property. Such vehicles are commonly loaded at a bulk storage plant, railroad siding or the like, and in some cases from another tank truck vehicle. The present inventor has seen many tank truck vehicles transporting liquid fuels over the road with the highly flammable product spilling over the tank and truck because the tank cover had inadvertently been left open. Safety authorities are concerned and are considering establishing regulations intended to prevent this type of operation. Prior to this invention there was no suitable safety device that could be made a requirement for tank vehicles insuring that the covers would be closed after loading and also after visual checking during the course of delivery.

The second problem concerns pilferage of the product. To prevent the customers from being cheated, the departments of weights and measures of states, cities and towns have instituted statutory requirements intended to insure that the customer will get the correct measure. Devices such as air separators, compartment selector valves that permit only one compartment to be opened at one time, ticket printing meters, etc. are so generally well known in the art that it is believed unnecessary to further recount their functions here. However, in the interest of clarifying the problem, two specific examples will show how readily these statutory requirements can be circumvented. While the public authorities are fully aware of the examples of pilfering about to be recited, they have heretofore been unable to cope with the problem because up to the present no means or method for preventing theft or misappropriation has been known. The method of this invention will make it possible for the first time to comply with a statutory requirement calling for mechanism capable of preventing theft of the type herein referred to.

Consider first a typical specific delivery situation where pilferage is not attempted. We will assume that a fuel oil customer, for example, orders from his supplier 200 gallons of fuel oil. The driver, upon reaching the customer's home, places a ticket in the ticket printing meter and pulls the handle. This generally locks the ticket in the meter and registers the starting numerals on the ticket prior to delivery. After starting the pump by engaging it with the engine through a power take-off mechanism and connecting the hose nozzle to the customer's tank fill pipe, the driver opens the meter valve and hose nozzle and the delivery of the product commences. If the meter is of the predetermined automatic stop type, it will automatically close the meter valve when 200 gallons have been delivered. If not, the driver will manually close the valve when 200 gallons have been delivered. He then pulls the handle on the meter, which releases the ticket after printing the gallons delivered. The ticket is then either mailed to the customer or left at the house, depending upon the company's procedure.

Assume now that a dishonest driver wants to pilfer a portion of the delivery. The above procedure is followed with these changes:

When the meter shows, for example, 180 gallons, the driver closes the delivery valve, either on the meter or hose nozzle, and removes the hose nozzle from the customer's tank fill pipe. He then, or later, as the case may be, opens the compartment on the top of the truck tank and pumps the last 20 gallons through the meter back into the tank. When the ticket is removed from the meter, it will show that 200 gallons were delivered to the customer's tank when, in fact, only 180 gallons were delivered. Thus, depending upon the number of times a day that pilferage occurs, a considerable amount of the product can be accumulated in the tank to be disposed of later by the dishonest driver.

Another method of pilfering from the customer is performed in such manner that there is little possibility of the customer observing the driver pumping oil back into the vehicle tank. This procedure is as follows: Prior to arriving at the customer's home, the driver inserts the customer's delivery ticket into the meter and pumps, for example, 20 gallons for the tank through the meter and back into the vehicle tank, leaving the ticket, however, in the meter, because removing the ticket automatically stamps it. When he arrives at the customer's location, he starts up the pump and apparently pumps the full amount of the product into the customer's tank. At the conclusion of the delivery the ticket is removed and it will show, for example, 200 gallons when, in fact, only 180 gallons were delivered.

From the foregoing it can be seen that the meter totalizer and the meter delivery tickets will correctly compare, but nevertheless the customer has, in fact, been cheated. This most undesirable situation, from the viewpoints of both the company and the customer leads to unfavorable relations which neither are responsible for. This kind of theft also contributes to customers' tanks running out of oil where the degree day system is utilized, as the dispatcher's calculations for the next delivery are based upon the customer having received the amount of oil stamped on the delivery ticket for the previous delivery.

A study of the examples of pilfering techniques described above show that in both cases the vehicle tank itself is an innocent accomplice, as it were. Therefore, it is an object of the present invention to prevent the use of the vehicle tank as a means of aiding in the theft of the product.

Accordingly, the prime object of this invention is to provide a novel, useful, inexpensive, practical and safe means and method whereby the safety and theft problems now present in the industry are effectively and simply solved.

My invention will be better understood from the following description taken in connection with the accompanying drawings and its scope will be pointed out in the appended claims.

FIG. 4 shows the invention used to close a valve in the oil supply line of a diesel engine.

FIG. 5 shows means for preventing engine operation when the ticket is in the meter should an attempt be made to put the vehicle in motion.

Figure 1:
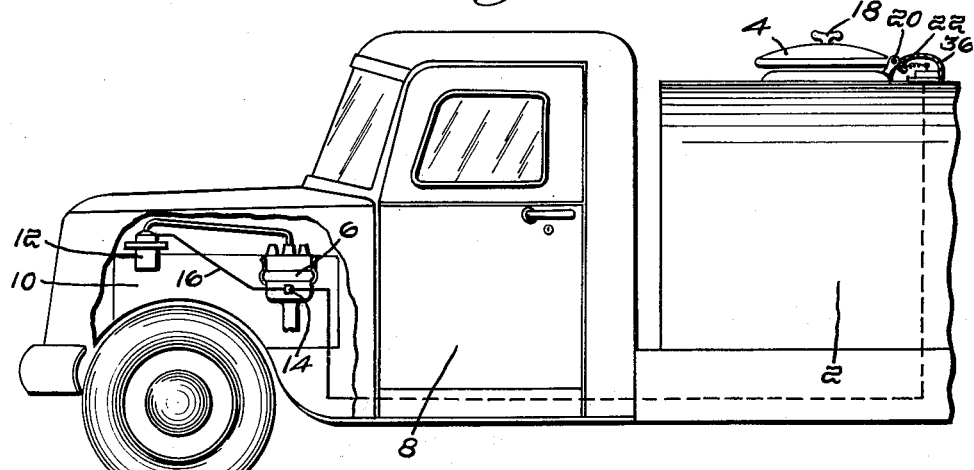
FIG. 1 is a side elevation of a tank truck vehicle with the tank cut away in part whereby the elements of the vehicle utilized by the invention are shown.

Referring now to FIG. 1, there is shown in particular a tank truck with tank 2, a tank compartment cover 4 and a distributor 6 which are the primary elements of the tank truck vehicle with which the invention is concerned. In this figure is shown a tank truck vehicle 8, an engine 10, an ignition coil 12, a distributor 6, a terminal 14, a wire 16 connecting the low voltage side of the coil 12 to the terminal 14 on the distributor 6. The functions of these elements recited are generally so well known that further description of them is not believed to be necessary. In regards to terminal 14, it is also well known that the distributor breaker points, internally located in the distributor, are electrically connected to this terminal. The other elements are shown in FIG. 1. The tank 2 contains the product to be transported and a hinged cover 4 has a locking handle 18, a hinge 20 and an extension 22 which acts as a back stop to limit the cover from opening too far.

Figure 2:
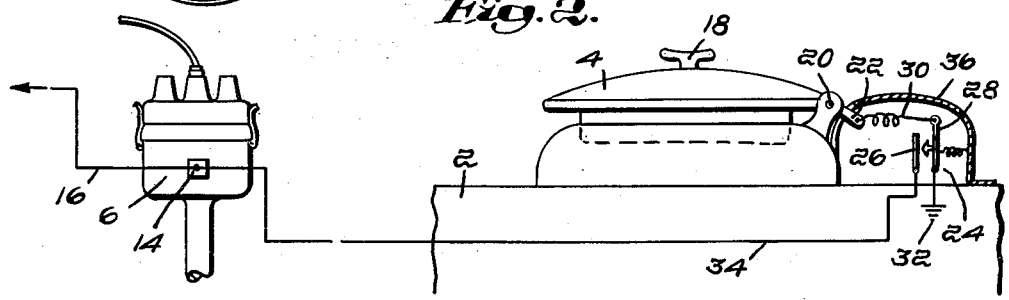
FIG. 2 is an enlarged view of the tank compartment cover shown in FIG. 1 having electrical means to render the engine of the tank vehicle ineffective when a cover is opened.

FIG. 2 shows an enlarged view of the cover details. Also shown is a switch 24 having a pair of electrical contacts 26 actuated by means of an armature 28. The armature 28 is connected through a spring 30 to the extension 22 of the cover 4. One of the contacts 26 of the switch 24 is shown grounded as at 32 and the other contact is shown connected through wire 34 to terminal 14 on the distributor 6. The switch is encased in a housing 36 of such character that tampering therewith is prevented.

Figure 3:
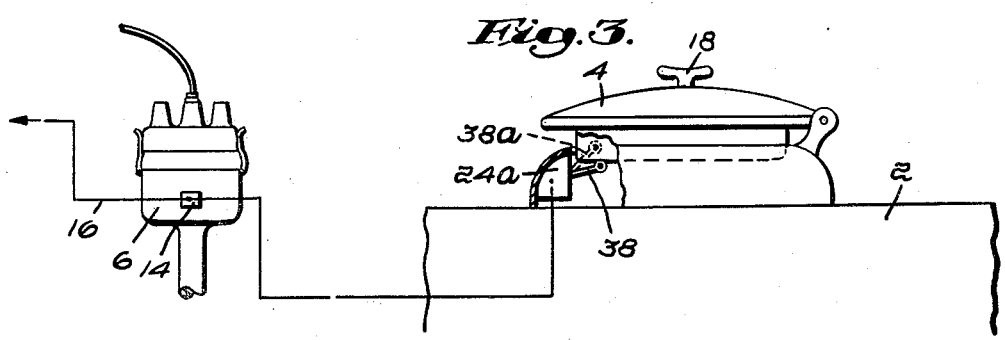
FIG. 3 is a view similar to FIG. 2 in which the electrical means is located within the cover and actuated by the cover position.

FIG. 3 shows a modified construction in which the switch 24a is located within the tank opening below the cover 4 in a position where the cover when closed will depress lever 38 to open the switch in the same manner switch 24 is opened by closing of cover 4 in FIG. 2. Upon opening of cover 4 in FIG. 3, lever 38 may swing upwardly to position 38a causing switch 24a to close.

FIG. 4 shows a fuel line 40 for the tank vehicle engine which may be, for example, a diesel engine. An electric valve 42 is inserted in the fuel supply line 40. A battery 44 is shown connected to one of the contacts 26 of the switch 24, the other contact of the switch connected through the wire 34 to the electric valve 42.

The operation of the invention of FIGS. 1, 2, 3 and 4 will now be explained in more detail. Referring to FIG. 1, there are shown the elements, essential to the invention, of a conventional tank truck vehicle. The pump, meter, hose, etc. are so well known in the art that additional drawings of them are not considered necessary. The tank truck vehicle 8 is shown powered with an engine 10, which may be an internal combustion engine of the gasoline type, as disclosed. The arrangement shown in FIG. 4 would be preferred for a diesel type engine. The product carried in tank 2 is usually discharged from the tank by means of a pump connected to the engine 10 through a power take-off mechanism. Vehicles carrying gasoline commonly discharge the product by gravity. An essential part of the ignition circuit for the vehicle 8 shown in FIG. 1 is the distributor 6 having a terminal 14 which is internally connected to the breaker points located within the distributor housing. A low voltage wire 16 is connected between the low voltage terminal on the ignition coil 12 and the terminal 14 on the distributor 6. An important part of the invention concerns the terminal 14. If this terminal becomes grounded, the breaker points in the distributor will become ineffective, thus causing the engine 10 to become inoperative. Another important part of the invention is the tank cover 4 which must be opened to permit the tank to be filled.

FIG. 2 discloses the method of the invention whereby the engine 10 is rendered ineffective whenever the tank cover is opened. This is accomplished in the following manner: When the tank cover 4 is opened, it will cause the contacts 26 of the switch 24 to close. The armature 28 of switch 24 is operatively linked to a part 22 of the cover; thus when the cover is opened, the switch will be automatically actuated. The type of linkage disclosed is for purposes of clarity and not necessarily preferred, and it will be understood that the switch must be protected against tampering as by, for example, an enclosing hood 36. Switch 24, once actuated, will close an electrical circuit, traced from ground through contacts 26, wire 34 to terminal 14 on the distributor 6. This effectively renders the engine 10 inoperative. If the engine is running, it will come to a stop or if at rest cannot be started as long as the tank cover remains open. Another suggested manner of linking the operation of the switch to the cover is shown in FIG. 3. This shows the switch 24a mounted in side of the tank and in such a manner that the underside of the cover 4 causes the switch to be actuated when the cover is closed. It is obvious that certain safety precautions such as explosion proof switches, etc. should be used if such an installation is to be considered.

FIG. 4 shows a solenoid or electrically operated valve 42 connected in the fuel line 40 of a diesel engine, for example. When the tank compartment cover is opened, switch 24, being operatively connected to a section of the cover 4, will be actuated. Switch 24 will then close a circuit from battery 44 through switch 24, through wire 34 to the electrically operated valve 42. Closure of this circuit will thus cause the valve 42 to close and stop the flow of fuel to the engine. Thus, as in FIGS. 2 and 3, the action of switch 24 will render the vehicle engine ineffective.

An alternative form of anti-pilfering device is shown in FIG. 5 in which the short circuiting of the distributor breaker points is achieved by mechanism associated with the ticket marking means arranged so that if a ticket is in the meter the engine cannot function to drive the vehicle although it can function to drive the pump with the vehicle stationary. This prevents pumping some of the liquid back into the truck prior to the arrival of the truck at the customers, which dishonest practice requires that the ticket remain in the meter until the pumping has been completed.

This construction includes a conduit 46 through which liquid flows in actuating the meter 48. The ticket 50 when inserted in the meter presses on arm 52 to close switch 54 which in the absence of a ticket is open. Wire 56 extends to a relay coil 58 which when energized will close switch 60 thus groundnig the low tension side of the distributor 62 thereby preventing engine operation.

Coil 58 is energized by the rotation of magnet 64 located on an element 66 which must rotate when the truck is in motion. Rotation of magnet 64 will induce a current in coil 68 mounted in inductive relationship to the magnet.

Thus with the ticket 50 in the meter and the truck in motion, switch 60 will promptly close to stop the engine. This prevents the type of pilfering which requires pumping fuel back into the tank with the ticket in the meter after which the truck is driven to the customer's tank and the remainder of the delivery pumped therein.

Having thus described my invention, it becomes obvious that many modifications and variations of the invention as herein set forth may be made without departing from the spirit and scope thereof and, therefore, only such limitations should be imposed as are indicated in the appended claims.

I claim:

1. In combination, an engine propelled tank truck vehicle for transporting liquid products in the tank, a ticket printing meter mounted on the vehicle to measure and indicate the flow of product therethrough, ignition means for the engine which renders the engine operable when said ignition means is effective, a vehicle element which rotates when the vehicle is in motion, signal generating means effective to generate an electrical signal when the said element is in motion, a first switching means responsive to the presence of a ticket in the meter, a second switching means responsive to the signal generating means, an electrical circuit connecting the signal generating means, the first switching means and the second switching means in relationship thereby to actuate the second switching means only when a ticket is in the meter and only when the said vehicle element is rotating, further means associated with the second switching means rendering the said ignition means for the engine ineffective when the said second switching means is actuated, thereby to prevent normal operation of the engine if the vehicle is in motion during the period a ticket is in the meter.

2. An engine driven vehicle comprising in combination, a tank having a cover connected therewith, engine ignition means including a distributor and ignition coil, in an ignition circuit, switch means associated with said cover and operable thereby, a normally open circuit independent of the ignition circuit capable of being closed by said switch means grounding said circuit coil and distributor when said cover is in the raised position rendering the engine inoperable.

3. Mechanism for controlling the effectiveness of the distributor and ignition coil in an ignition circuit of an internal combustion engine in a vehicle arranged to transport products in a tank, said tank characterized by having an access opening and a cover associated therewith, said mechanism including a switch actuated by said cover, a normally open circuit independent of the ignition circuit, said open circuit being closed by said switch means grounding the low voltage side of said ignition circuit when the cover is in the raised position whereby said engine is rendered inoperable.

References Cited in the file of this patent

UNITED STATES PATENTS

| | | |
|---|---|---|
| 1,705,649 | Scott | Mar. 19, 1929 |
| 1,892,825 | Aske et al. | Jan. 3, 1933 |
| 2,166,060 | Kirk | July 11, 1939 |
| 2,182,426 | Courcier | Dec. 5, 1939 |
| 2,575,939 | Brouer | Nov. 30, 1951 |
| 2,637,407 | Burke et al. | May 5, 1953 |
| 2,663,459 | La Grange et al. | Dec. 22, 1953 |
| 2,847,023 | Hansen et al. | Aug. 12, 1958 |
| 2,876,856 | Greene | Mar. 10, 1959 |